(12) United States Patent
Pollitt

(10) Patent No.: US 12,066,054 B2
(45) Date of Patent: Aug. 20, 2024

(54) COMPOSITE CONNECTORS AND METHODS OF MANUFACTURING THE SAME

(71) Applicant: Crompton Technology Group Limited, Solihull (GB)

(72) Inventor: Will Pollitt, Kenilworth (GB)

(73) Assignee: CROMPTON TECHNOLOGY GROUP LIMITED, Solihull (GB)

( * ) Notice: Subject to any disclaimer, the term of this patent is extended or adjusted under 35 U.S.C. 154(b) by 985 days.

(21) Appl. No.: 16/536,353

(22) Filed: Aug. 9, 2019

(65) Prior Publication Data

US 2020/0049180 A1    Feb. 13, 2020

(30) Foreign Application Priority Data

Aug. 10, 2018 (EP) .................................. 18275116

(51) Int. Cl.
| F16L 9/12 | (2006.01) |
| B29C 53/56 | (2006.01) |
| B29C 53/80 | (2006.01) |
| B29C 57/00 | (2006.01) |
| B29C 70/28 | (2006.01) |
| C08J 5/04 | (2006.01) |

(Continued)

(52) U.S. Cl.
CPC ............ *F16B 9/052* (2018.08); *B29C 53/566* (2013.01); *B29C 53/8008* (2013.01); *B29C 57/00* (2013.01); *B29C 70/28* (2013.01); *C08J 5/046* (2013.01); *F16B 9/02* (2013.01); *F16L 47/14* (2013.01); *F16L 9/12* (2013.01)

(58) Field of Classification Search
CPC ........ F16L 47/14; F16L 9/12; B29K 2101/12; B29K 2105/12; B29K 2105/102; B29C 45/1418
USPC .......................................................... 285/405
See application file for complete search history.

(56) References Cited

U.S. PATENT DOCUMENTS

| 746,648 A | 12/1903 | Tippett |
| 3,156,489 A | 11/1964 | Deringer |

(Continued)

FOREIGN PATENT DOCUMENTS

| CN | 2502105 Y | 7/2002 |
| CN | 102278342 A | 12/2011 |

(Continued)

OTHER PUBLICATIONS

Extended European Search Report for International Application No. 18275115.6 dated Jan. 23, 2019, 9 pages.

(Continued)

*Primary Examiner* — William S. Choi
(74) *Attorney, Agent, or Firm* — CANTOR COLBURN LLP

(57) ABSTRACT

A method of manufacturing a composite (e.g. fibre-reinforced polymer) connector for a fluid transfer conduit comprises: providing a tubular mandrel which extends substantially parallel to a central axis C; winding continuous fibre reinforcement, impregnated with a thermosetting polymer, around the mandrel to form a tubular hub portion which extends substantially parallel to the central axis C; curing the hub portion; placing the hub portion into a mould featuring at least one cavity; and introducing polymer into the mould so as to fill the at least one cavity to form a flange portion around the hub portion.

7 Claims, 6 Drawing Sheets

(51) Int. Cl.
  *F16B 9/00* (2006.01)
  *F16B 9/02* (2006.01)
  *F16L 47/14* (2006.01)

(56) References Cited

U.S. PATENT DOCUMENTS

| | | | |
|---|---|---|---|
| 3,224,795 | A | 12/1965 | Conley |
| 3,537,484 | A | 11/1970 | McLarty |
| 3,651,661 | A | 3/1972 | Darrow |
| 3,899,006 | A | 8/1975 | Champleboux et al. |
| 3,920,049 | A | 11/1975 | Lippert et al. |
| 4,217,935 | A | 8/1980 | Grendelman et al. |
| 4,225,158 | A | 9/1980 | Puechavy |
| 4,256,790 | A | 3/1981 | Lackman et al. |
| 4,330,016 | A | 5/1982 | Grendelman |
| 4,511,423 | A | 4/1985 | Magarian et al. |
| 4,622,091 | A | 11/1986 | Letterman |
| 4,702,498 | A | 10/1987 | Mueller et al. |
| 4,813,457 | A | 3/1989 | Offringa et al. |
| 4,846,908 | A | 7/1989 | Aldrich et al. |
| 4,980,006 | A | 12/1990 | Bordner |
| 5,106,130 | A | 4/1992 | Ellsworth et al. |
| 5,110,644 | A | 5/1992 | Sparks et al. |
| 5,135,596 | A | 8/1992 | Raumfahrt |
| 5,397,272 | A | 3/1995 | Smiley et al. |
| 5,685,933 | A | 11/1997 | Ohta |
| 6,251,332 | B1 | 6/2001 | Nakagawa et al. |
| 6,361,080 | B1 * | 3/2002 | Walsh ............... F16L 47/14 285/405 |
| 7,138,167 | B2 | 11/2006 | Sakonjo et al. |
| 8,424,921 | B2 * | 4/2013 | Marlin ............... F16L 47/14 285/405 |
| 8,491,740 | B2 | 7/2013 | Serey et al. |
| 8,800,605 | B2 | 8/2014 | Barlow et al. |
| 8,813,335 | B2 | 8/2014 | Geislinger et al. |
| 8,899,274 | B1 * | 12/2014 | Grosch ........................ 285/405 |
| 9,140,140 | B2 | 9/2015 | McMillan |
| 9,222,605 | B2 | 12/2015 | Ciolczyk et al. |
| 9,482,266 | B2 | 11/2016 | Dewhirst |
| 9,731,453 | B2 | 8/2017 | Humfeld et al. |
| 9,897,122 | B2 | 2/2018 | Luce |
| 9,937,671 | B2 | 4/2018 | Larson |
| 10,539,174 | B2 | 1/2020 | Gurvich et al. |
| 2003/0193194 | A1 | 10/2003 | Sadr |
| 2009/0200700 | A1 | 8/2009 | Marlin et al. |
| 2009/0243284 | A1 | 10/2009 | Klingel, Jr. et al. |
| 2010/0122749 | A1 | 5/2010 | Bouleti et al. |
| 2011/0192528 | A1 | 8/2011 | Kozaki et al. |
| 2012/0057267 | A1 | 3/2012 | Petit et al. |
| 2013/0236664 | A1 | 9/2013 | Tsotsis |
| 2013/0266431 | A1 | 10/2013 | Moram et al. |
| 2014/0138947 | A1 | 5/2014 | Palsson et al. |
| 2014/0309042 | A1 | 10/2014 | Chase et al. |
| 2015/0176732 | A1 | 6/2015 | Courpet et al. |
| 2015/0299913 | A1 | 10/2015 | Hori et al. |
| 2015/0343716 | A1 | 12/2015 | Feeney et al. |
| 2016/0273696 | A1 * | 9/2016 | Gonzalez Bayon |
| 2016/0356403 | A1 * | 12/2016 | Perrigo |
| 2017/0191618 | A1 | 7/2017 | Kloft et al. |
| 2017/0198734 | A1 | 7/2017 | Bernard et al. |
| 2017/0227058 | A1 | 8/2017 | Pollitt |
| 2020/0049181 | A1 | 2/2020 | Pethick |
| 2020/0049182 | A1 | 2/2020 | Bernard et al. |
| 2020/0049282 | A1 | 2/2020 | Giannakopoulos et al. |
| 2020/0049283 | A1 | 2/2020 | Chase et al. |
| 2020/0049284 | A1 | 2/2020 | Pollitt et al. |
| 2020/0049296 | A1 | 2/2020 | Giannakopoulos et al. |
| 2020/0316830 | A1 | 10/2020 | Bernard et al. |
| 2021/0069937 | A1 | 3/2021 | Peterson |
| 2023/0160505 | A1 | 5/2023 | Pollitt et al. |
| 2024/0009942 | A1 | 1/2024 | Pethick |
| 2024/0060582 | A1 | 2/2024 | Chase et al. |

FOREIGN PATENT DOCUMENTS

| | | |
|---|---|---|
| CN | 106015302 A | 10/2016 |
| CN | 206840761 U | 1/2018 |
| CN | 108268692 A | 7/2018 |
| DE | 19834772 A1 | 2/2000 |
| DE | 19906618 A1 | 8/2000 |
| DE | 102008033577 A1 | 1/2010 |
| DE | 102011077287 A1 | 12/2012 |
| DE | 102013005649 A1 | 10/2014 |
| DE | 102014004157 A1 | 9/2015 |
| EP | 1324092 A1 | 7/2003 |
| EP | 1859958 B1 | 9/2010 |
| EP | 3332946 A1 | 6/2018 |
| FR | 2706574 A1 | 12/1994 |
| GB | 1222041 A | 2/1971 |
| GB | 2033992 A | 5/1980 |
| GB | 2082730 A | 3/1982 |
| JP | 2875865 B2 | 3/1999 |
| JP | 03276221 B2 | 4/2002 |
| JP | 2013044358 A | 3/2013 |
| WO | 2010092979 A1 | 8/2010 |
| WO | 2011039828 A1 | 4/2011 |
| WO | 2011039929 A1 | 4/2011 |
| WO | 2013041948 A1 | 3/2013 |
| WO | 2017123399 A1 | 7/2017 |

OTHER PUBLICATIONS

Extended European Search Report for International Application No. 18275116.4 dated Feb. 28, 2019, 24 pages.
Extended European Search Report for International Application No. 18275117.2 dated Feb. 27, 2019, 13 pages.
Extended European Search Report for International Application No. 18275118.0 dated Feb. 26, 2019, 7 pages.
Extended European Search Report for International Application No. 18386023.8 dated Feb. 27, 2019, 7 pages.
Extended European Search Report for International Application No. 18386024.6 dated Feb. 27, 2019, 7 pages.
Extended European Search Report for International Application No. 18386025.3 dated Feb. 28, 2019, 13 pages.
Abstract for DE102013005649 (A1), Published: Oct. 2, 2014, 1 page.
Abstract for DE19834772 (A1), Published: Feb. 10, 2000, 1 page.
EPO Official Letter for Application No. 18275118.0, dated Jun. 29, 2022, 4 pages.
EPO Official Letter for Application No. 18386023.8, dated Jun. 28, 2022, 3 pages.
EPO Official Letter for Application No. 18386024.6, dated Jun. 29, 2022, 4 pages.
EPO Official Letter for Application No. 18386025.3, dated Jun. 29, 2022, 3 pages.
Abstract for CN106015302 (A), Published Oct. 12, 2016, 1 page.
Abstract of CN102278342, Published Dec. 14, 2011, 1 page.
Abstract of CN108268692, published Jul. 10, 2018, 1 page.
First CN Office Action for Application No. 201910725776.2, dated Dec. 28, 2021, 7 pages
Machine Transmittal of First CN Office Action for Application No. 201910725776.2, dated Dec. 28, 2021, 6 pages.
Abstract of DE102011077287 (A1), Published: Dec. 13, 2012, 1 Page.
CN Office Action for Application No. 201910725776.2, dated May 29, 2023, 7 pages.
Machine Translation for CN2502105Y, Published: Jul. 24, 2002, 4 pages.
DE102008033577A1—Machine Translation—English (Year: 2008), 8 pages.
DE102014004157A1—Machine Translation—English (Year: 2014), 20 pages.

* cited by examiner

COMPOSITE CONNECTORS AND METHODS OF MANUFACTURING THE SAME

FOREIGN PRIORITY

This application claims priority to European Patent Application No. 18275116.4 filed Aug. 10, 2018, the entire contents of which is incorporated herein by reference.

TECHNICAL FIELD

The present disclosure relates to composite (e.g. fibre-reinforced polymer) connectors e.g. for connecting fluid transfer conduits to other structures, and to methods of manufacturing composite (e.g. fibre-reinforced polymer) connectors for fluid transfer conduits.

BACKGROUND

Fluid transfer conduits (e.g. fuel pipes) are typically connected to other fixed structures (e.g. inside aeroplane wings) using one or more connectors. To allow for movement of the fixed structure without inducing large stresses on the fluid transfer conduit itself (e.g. as a wing flexes during flight), such connectors are designed to tolerate a small amount of relative movement between the fluid transfer conduit and the structure whilst still effectively supporting the conduit and sealing the connection. This is often achieved using an elastomeric O-ring, on which the fluid transfer conduit "floats", to seal the connection while allowing a small amount of relative motion.

In many applications, such connectors are required to withstand large circumferential loads (e.g. due to high internal pressures in a fluid transfer conduit) as well as other stresses. To provide the requisite strength while minimising part count, connectors are conventionally machined from a single block of metal (usually aluminium). However, this process results in a large amount of material being wasted (i.e. a very high so-called buy-to-fly ratio).

Furthermore, fluid transfer conduits are increasingly being constructed from composite materials (e.g. fibre-reinforced polymers), in order to save weight. However, when used with metallic connectors, composite fluid transfer conduits can experience various problems such as galvanic corrosion and a reduced temperature operating window due to unequal thermal expansion.

More recently, therefore, an alternative manufacturing technique has been developed whereby composite connectors are produced by injection moulding a thermoplastic matrix reinforced with randomly oriented chopped fibres (e.g. carbon/glass/aramid fibres). Because injection moulding is an additive process, it results in less wasted material during manufacture as compared to conventional metal machining techniques. In addition, chopped-fibre reinforced composite parts are typically lighter than their metal equivalents. However, an injection-moulded connector using thermoplastic polymer material requires a thermoplastic resin with a suitable operating temperature, which is very expensive e.g. as compared to thermosetting resins. In addition, chopped-fibre reinforcement does not exploit fully the potential strength of reinforcing fibres.

SUMMARY

According to one aspect of the present disclosure, there is provided a composite (e.g. fibre-reinforced polymer) connector for a fluid transfer conduit comprising: a hub portion comprising a tube which extends substantially parallel to a central axis; and a flange portion which extends from the hub portion at an angle to the central axis; wherein the hub portion comprises a thermosetting polymer reinforced with continuous circumferentially-oriented fibre reinforcement; and wherein the flange portion comprises a polymer that is moulded onto the hub portion.

Because the flange portion is moulded onto the hub portion, the moulded form of the flange can be easily adjusted regardless of how the hub portion is formed (e.g. using standard filament winding processes).

Because of the high strength-to-weight ratio of continuous fibre-reinforced polymer, the use of continuous circumferentially-oriented fibre reinforcement in the hub portion can produce a significantly stronger part using the same amount of material compared to randomly-oriented fibre reinforcement or entirely metal parts. Correspondingly, an equally strong part may be produced using less material, thus saving weight.

A composite connector according to the present disclosure may be produced using additive processes. This means that there is little material wasted during manufacture, especially compared to machining techniques used to construct conventional metal components. As a result, the cost of manufacturing a composite connector according to the present disclosure may be less than for an equivalent metal component, even if the underlying material costs are higher (due to less material going to waste).

When continuous fibre reinforcement is used to make a given component, the orientation of the continuous fibres can be tailored to the direction in which the resulting component will experience loads. Many fibres may be oriented in a primary direction of loading, and a lower proportion of fibres may therefore be oriented in directions in which the component experiences little load. This minimises the amount of material wasted when producing a part with a given load capacity.

In this case, the continuous circumferential fibre in the hub portion provides increased hoop (circumferential) strength, improving the connector's resistance to high radial loads (e.g. due to high pressure fluid within a fluid transfer conduit connected to the hub portion).

When using randomly-oriented fibre reinforcement, no such tailoring can be performed, and as such the amount of material required to provide the required load resistance is increased. In addition, even when oriented in the direction of loading, chopped fibres inherently exhibit much lower tensile strength than the equivalent amount of continuous fibres. US 2016/0273696 describes an example of a composite part injection-moulded from a thermoplastic matrix reinforced by chopped fibres.

A connector according to the present disclosure benefits from a material cost saving over a thermoplastic composite component because the hub portion comprises a fibre-reinforced thermosetting polymer such as an epoxy resin.

As mentioned above, the composite connector of the present disclosure may be produced using less material than conventional metal connectors, reducing component weight. In many applications, such as the aerospace industry, any weight saving is highly advantageous as it can lead to significant fuel (and thus cost) savings over the lifetime of a part.

In addition to the weight savings provided by the present disclosure, the use of continuous circumferentially-oriented fibre reinforcement within the hub portion of the connector confers other benefits. The continuous circumferential fibre reinforcement stiffens the hub portion and increases its hoop strength (i.e. resistance to internal and external pressures). When fluid at high pressure is passed through the fluid transfer conduit, this stiffness and strength mitigates hoop expansion of the composite connector when subject to internal pressures, ensuring that a good connection and seal is maintained at all times.

"Continuous" fibre reinforcement is used herein to refer to fibre reinforcement in which at least some individual constituent filaments have a substantial length, i.e. they are not short "chopped fibres" or discontinuous fibres. In at least some examples, the fibre reinforcement may be considered to be "continuous" when the fibres or filaments have a length on the same scale as the part they are reinforcing. This means that the fibre reinforcement is substantially "continuous" when it extends uninterrupted across a given dimension of a part, such as a length, radius or circumference.

The continuous circumferentially-oriented fibre reinforcement in the hub portion preferably comprises at least some individual constituent filaments which extend around a significant fraction of the circumference of the hub portion, e.g. extending at least 90°, 180°, 270° or more around the central axis of the hub portion. Further preferably the continuous circumferentially oriented fibre reinforcement in the hub portion preferably comprises at least some individual constituent filaments which extend entirely around the circumference of the hub portion, e.g. at least 360° around the central axis, and even further preferably make several complete loops around the central axis of the hub portion.

The strength of fibre-reinforced polymers lies in the tensile strength of the reinforcing fibres and as such, an uninterrupted length of continuous fibre wrapping around the circumference of the hub portion provides a significant improvement in hoop strength and thus pressure resistance when compared to the same amount of chopped fibres, even if all of the chopped fibres were to be aligned in the direction of loading.

As mentioned above, an elastomeric O-ring may be used to seal a connection between the connector and a fluid transfer conduit, in use. In such cases the O-ring may be positioned between an outer surface of the fluid transfer conduit and an inner surface of the hub portion (or, conversely, between an inner surface of the conduit and an outer surface of the hub portion), to seal the connection. Optionally, the elastomeric O-ring is seated between a pair of retaining ridges that allow for axial movement between the fluid transfer conduit and the hub portion. The strong and stiff hub portion keeps the O-ring tightly pressed radially between the inner surface of the hub portion and the outer surface of the fluid transfer conduit, ensuring the integrity of the seal.

In addition to the strength benefits, utilising continuous circumferentially-oriented fibre reinforcement in the hub portion also enables the coefficient of thermal expansion (i.e. the "hoop" CTE) of the hub portion to be closely matched to that of a fluid transfer conduit to which it may be connected.

Fluid transfer conduits for which the connector of the present disclosure is particularly suitable are composite parts manufactured from fibre-reinforced polymers comprising a high proportion of continuous circumferentially-oriented fibres. This maximises the hoop strength and thus the internal pressure tolerance of the conduit, something which is particularly important in high pressure systems such as fuel pipes, while minimising weight. Because of the high proportion of circumferential fibre in such composite conduits, when the fluid transfer conduit is subject to a change in temperature (e.g. due to changing ambient conditions), the hoop expansion is dominated by the expansion of the fibre reinforcement. Fibres used as reinforcement in such materials typically have a very low CTE compared to the polymer matrix. For example, glass fibres have a CTE of around $1.6$-$2.9\times10^{-6}$ $K^{-1}$ and carbon fibres have a CTE which is very close to zero (and may even be negative, e.g. roughly $-0.5\times10^{-6}$ $K^{-1}$), while a typical polymer resin has a CTE of $\sim50\times10^{-6}$ $K^{-1}$ (for comparison, aluminium has a CTE of $\sim23\times10^{-6}$ $K^{-1}$). As a result, the circumferential (hoop) thermal expansion of a fibre-reinforced polymer conduit with continuous circumferential fibre is usually low.

Injection-moulded, randomly-oriented chopped fibre-reinforced composites, in comparison, have a hoop CTE which is dominated by the CTE of the resin matrix—i.e. much higher than that of the fibre-reinforced polymer (FRP) conduits described above. Metal connectors also suffer relatively high thermal expansion.

Conventional connectors therefore, when used with fibre-reinforced polymer conduits, can only be used within a small temperature operating envelope. Differential expansion of the connector and the conduit when subject to temperatures outside this envelope can risk the integrity of the seal and/or the entire connection. Or, the requirement to accommodate such temperature variations and differing CTEs puts design constraints on other elements such as the O-ring. A similar issue arises when a connector has a different stiffness to that of a conduit.

However, as mentioned above, because the hub portion in examples of the present disclosure comprises continuous circumferentially-oriented fibre reinforcement, its hoop CTE (and its stiffness) can be more closely matched to that of a given fluid transfer conduit. Matching the CTE allows relative expansion (of the connector relative to the conduit) during use to be minimised over a wider range of temperatures, increasing the applicability and reliability of the part. In some examples, therefore, the composition and orientation of fibre reinforcement within the hub portion is selected such that the CTE of the hub portion matches that of a fluid transfer conduit, formed from FRP, that is connected to the hub portion in use. Additionally or alternatively, the composition and orientation of the fibre reinforcement within the hub portion is selected such that the stiffness of the hub portion substantially matches that of the fluid transfer conduit.

The hub portion is preferably arranged to fit onto or into a fluid transfer conduit, e.g. concentric therewith, with a conduit fitting over an outer diameter of the hub portion or inside an inner diameter of the hub portion. The flange portion is preferably arranged to attach to a further structure and may comprise one or more attachment points. For example, an attachment point may take the form of a through-hole formed in the flange portion. The flange portion may comprise at least one through-hole which may, for example, be used along with a suitable fastening means (e.g. a nut and bolt) to secure the connector to a further structure. The through-hole may be formed by drilling through a completed connector. Alternatively, the at least one through-hole may be formed at the same time as the rest of the flange portion, as is explained in more detail below.

There is further disclosed a connection system comprising a composite connector as disclosed herein and a fibre-reinforced polymer fluid transfer conduit connected to the hub portion. In one or more examples, the composition and orientation of the fibre reinforcement within the hub portion is selected such that the CTE of the hub portion substantially matches that of the fluid transfer conduit. Additionally or alternatively, the composition and orientation of the fibre reinforcement within the hub portion is selected such that the stiffness of the hub portion substantially matches that of the fluid transfer conduit.

Fluid transfer conduits for which the connector of the present disclosure is particularly suitable are often manufactured using thermosetting polymers, because these are highly suited to the filament winding processes typically employed to manufacture such conduits. Thus the fluid transfer conduit in such a connection system may also comprise a thermosetting polymer, preferably reinforced with continuous circumferentially-oriented fibre reinforcement.

In one or more examples, CTE matching may be achieved by matching the composition and angle of continuous circumferentially-oriented fibre reinforcement within the hub portion to the composition and angle of continuous circumferentially-oriented reinforcing fibre within the FRP conduit. The continuous circumferentially-oriented fibre in the hub portion may therefore have substantially the same fibre angle as the continuous circumferentially-oriented fibre in the conduit. In some examples these fibre angles may differ by no more than 15°, or no more than 10°, and, preferably, by no more than 5°.

In the hub portion, the continuous circumferentially-oriented (hoop) fibre typically makes an angle of more than 60° to the central axis. In preferred examples the continuous circumferentially-oriented fibre reinforcement extends at an angle of more than 80° to the central axis, e.g. at least 85°, or even at or close to 90°. A high angle maximises the hoop strength provided by the continuous circumferentially-oriented fibre reinforcement. In various examples, the hub portion is predominantly hoop-wound, i.e. comprising multiple layers of continuous circumferentially-oriented fibre reinforcement extending at an angle of more than 80° to the central axis. In various examples, the continuous circumferentially-oriented fibre reinforcement within the hub portion may comprise layers of high-angle hoop fibre reinforcement and layers of lower angle helical fibre reinforcement, to help tolerate in-service axial forces.

In some examples the hub portion comprises a mixture of layers of longitudinal or helical fibre reinforcement, and continuous circumferentially-oriented fibre reinforcement, e.g. alternating layers of longitudinal/helical and continuous circumferential fibre reinforcement. This provides the hub portion with uniform strength and mitigates delamination during use. Mixing layers of fibre with different orientations may also prevent large residual stresses being produced during manufacture, which can severely weaken the connector.

It will therefore be appreciated that the hub portion may comprise additional fibre reinforcement oriented at a variety of angles. In some examples, the hub portion further comprises longitudinal or axial fibre reinforcement (i.e. fibre reinforcement which is oriented substantially parallel to the central axis, e.g. close to 0°, which may increase the resistance of the hub portion to bending loads. Additionally or alternatively, the hub portion may comprise helical fibre reinforcement oriented at roughly 45° to the central axis (i.e. midway between the axial and circumferential directions). This can help with CTE matching and/or may aid the detection of barely-visible impact damage (BVID) to the hub portion.

The hub portion preferably comprises a tube with a substantially circular cross-section (i.e. the hub portion comprises a cylinder). A circular cross-section maximises the hoop strength of the hub portion and can by easier to manufacture. In some examples, however, the tube may have a rectangular, other polygonal or an elliptical cross-section, amongst other possible shapes. Preferably the hub portion has a cross-section which matches that of a fluid transfer conduit to which it is suitable for connecting. In a connection system as disclosed above, the hub portion may have substantially the same cross-section as the fluid transfer conduit.

The hub portion may further comprise at least one keying feature which provides a mechanical connection between the hub portion and the flange portion. The keying feature may extend axially and/or circumferentially relative to the central axis, i.e. at any suitable angle from 0° to 90°. The keying feature may comprise any feature suitable for providing a mechanical connection, e.g. a dovetail, a protrusion, a groove or a spline, in or on the hub portion. The keying feature may increase the strength of the joint between the hub portion and the flange portion.

The angle to the central axis at which the flange portion extends is preferably greater than 45°, and the flange portion is further preferably substantially perpendicular to the central axis of the hub portion, i.e. at 90°, to enable secure attachment to a surface normal to the central axis. In some examples the entire flange portion may not extend at the same angle to the central axis but may be shaped to accommodate the shape of a particular structure.

It will be appreciated that the flange portion comprises a polymer that may be the same as, or different from, the thermosetting polymer of the hub portion. In some examples, the polymer comprised by the flange portion may be a thermoplastic polymer. In some examples, the polymer comprised by the flange portion is preferably a thermosetting polymer, such as a polyester, epoxy or phenolic resin. Thermosetting polymers provide high strength, are easy to work with and can be less expensive than alternatives. Thermosetting polymers may also bond more securely to the hub portion. Alternatively, the flange portion may comprise a thermoplastic polymer, such as polyphenylene sulfide (PPS), polyether ether ketone (PEEK), polyetherketoneketone (PEKK), polyetherketone (PEK) or another polymer part of the polyaryletherketone (PAEK) family.

The Applicant has appreciated that in typical use of a fluid transfer conduit connector, fluid at high pressure may be carried by a conduit to which the connector is connected, contributing to large radial forces on the hub portion of the connector. However, as the flange portion would not ordinarily be directly exposed to these pressures, the forces experienced by the flange portion are typically much lower. As such, the strength requirements for the flange portion may be lower than that for the hub portion. In some examples therefore it is acceptable for the flange portion to comprise little or no fibre reinforcement and thus the flange portion may consist of non-reinforced polymer. This can reduce manufacturing complexity and reduce the cost of the resultant part.

In examples wherein the flange portion consists of non-reinforced polymer, there may be negligible amounts of fibre reinforcement present. For instance, there may be a trivial quantity of fibre reinforcement that has unintentionally spread from the hub portion during manufacture of the composite connector. Aside from unintentionally included fibre reinforcement, the polymer of the flange portion may optionally include one or more non-fibre material additives. For example, the non-reinforced polymer may include small quantities of one or more non-fibre material additives intended to alter one or more non-structural properties of the polymer, such as viscosity, thermal or electrical conductivity, radiation sensitivity, colour, fire or chemical resistance etc.

For example, in aircraft fuel systems, it is important to control the conductivity of the composite connector. Ideally the fuel system (i.e. comprising pipes and connectors) is insulating enough to avoid becoming the preferred path for lighting conduction, whilst conductive enough to avoid static build-up due to fuel flow. Adding a particular amount of a conductive additive (e.g. carbon black, carbon nanotubes or graphene) to the polymer during manufacture allows the desired level of conductivity to be achieved. Such an additive is ideally present throughout the component (i.e. in both the flange portion and the hub portion), although this is not essential. For example, if carbon fibre reinforcement is used in the hub portion but the flange portion contains no carbon fibre reinforcement (e.g. in examples where the flange portion comprises unreinforced polymer), a carbon black additive may only need to be present in the flange portion (as the carbon fibres in the hub portion are already conductive).

To control the conductivity of a fuel system, it may not be necessary to control the conductivity of both the pipe(s) and the connector(s). It may be sufficient, in at least some cases, for the conductivity of only the pipe(s) to be controlled (e.g. by adding a certain concentration of carbon black during pipe manufacture). The connector then simply needs to comprise a minimum level of conductivity for the desired overall conductivity to be achieved. Alternatively, the conductivity of the connector(s) may be controlled and used with a pipe with a simple minimum conductivity.

While the forces experienced by the flange portion are typically lower than those experience by the hub portion, the flange portion may still have to resist significant bending loads (e.g. as a wing flexes during flight). In some examples, the flange portion may comprise some chopped-fibre reinforcement to increase its strength whilst not significantly increasing the complexity of manufacture (explained in more detail below) or the cost of the finished component.

The type of fibre reinforcement in the hub portion (and optionally in the flange portion) may be chosen based upon one or more desired properties of the finished composite connector. For example, composite connectors requiring very high strength may utilise carbon fibres, whilst those requiring high strength but low conductivity may utilise glass fibres. In examples featuring chopped fibres in the flange portion, these fibres may be of a different type to the continuous fibres in the hub portion although they are preferably the same (e.g. continuous glass fibres in the hub portion and chopped glass fibres in the flange portion).

The connector may comprise one or more strengthening or stiffening structures extending between the flange portion and the hub portion. For example, the connector may comprise one or more ribs arranged to strengthen the joint between the hub portion and the flange portion.

The present disclosure extends to a method of manufacturing a composite (e.g. fibre-reinforced polymer) connector for a fluid transfer conduit, the method comprising: providing a tubular mandrel which extends substantially parallel to a central axis; winding continuous fibre reinforcement, impregnated with a thermosetting polymer, around the mandrel to form a tubular hub portion which extends substantially parallel to the central axis; curing the hub portion; placing the hub portion into a mould featuring at least one cavity; introducing polymer into the mould so as to fill the at least one cavity to form a flange portion around the hub portion.

As is discussed above, using a moulding step to form the flange portion around the hub portion means that the form of the flange portion can be easily adjusted independently of the winding process used to form the hub portion. The winding step is preferably a filament winding process. The continuous fibre reinforcement may be pre-impregnated with the thermosetting polymer or impregnated with the thermosetting polymer during winding, for example by passing the fibre reinforcement through a polymer bath as part of the winding process.

The hub portion may be cured before or after addition of the flange portion by the moulding steps. In some examples, the method comprises curing the hub portion before overmoulding the flange portion, i.e. the flange portion is co-bonded to the hub portion. This may be particularly suitable for a flange portion comprising a thermoplastic polymer. Alternatively, the hub portion may not be cured (or only partially cured) before the flange portion is added by the moulding steps. Thus in some examples, the method may comprise curing both the hub and flange portions to form the composite connector. In these examples the hub and flange portions may be co-cured (i.e. cured simultaneously). This may be particularly suitable for a flange portion comprising a thermosetting polymer.

In some examples, the polymer introduced into the mould may comprise a thermoplastic polymer. However, a thermoplastic polymer may not bond well to the thermosetting polymer (e.g. epoxy resin) used to form the hub portion. Thus, in one or more examples, the polymer introduced into the mould preferably comprises a thermosetting polymer, such as epoxy or phenolic resins. In such examples the method further comprises curing the flange portion before extracting the connector from the mould. As mentioned above, the flange portion may optionally be co-cured with the hub portion. Thermosetting polymers typically have a lower viscosity than alternatives, which can enable more uniform distribution of the polymer around the mould and/or a reduction in void formation. This can lead to a stronger and more reliable flange portion.

Manufacturing the hub portion separately from the flange portion can reduce manufacturing costs, as a common hub portion may be produced in large quantities, and connectors with varying flange portions (e.g. for different applications) may be produced by changing only the mould used when forming the flange portion.

The method may comprise performing one or more further processing steps to the hub portion before it is placed into the mould. For example, the method may comprise forming at least one keying feature to provide a mechanical connection between the hub portion and the flange portion, e.g. forming a dovetail, a protrusion, a groove or a spline, in or on the hub portion. This may increase the strength of the joint between the hub portion and the flange portion.

The method may further comprise applying a vacuum to the mould to draw the polymer through the mould. Additionally or alternatively, the polymer may be introduced under pressure, i.e. actively pumped into the mould. Both of these techniques can speed up the moulding process and/or improve the uniformity of the finished component.

The Applicant has recognised that the method disclosed herein is particularly suited to resin transfer moulding (RTM), in which the mould comprises a rigid mould (e.g. made of metal) which entirely envelops at least one portion of the hub portion (e.g. upper and lower moulds which surround the tube and define the at least one cavity when brought together). Thus, in one or more examples, the method comprises a resin transfer moulding process to form the flange portion around the hub portion. An RTM process provides a high quality tool-surface finish on all external surfaces of the composite component and can produce parts quickly, making it particularly suitable for high-volume production of connectors. An all-metallic mould can also aid the even application of heat during curing. In such examples, the polymer introduced into the mould preferably comprises a thermosetting polymer.

Alternatively, in some examples the method herein may comprise an injection moulding process, in which the polymer introduced into the mould comprises a thermoplastic polymer.

The mould may comprise one or more features arranged to form corresponding features on the finished connector. For example, the mould may comprise at least one boss arranged to form at least one corresponding through-hole in the flange portion of the resultant connector. Additionally or alternatively, the mould may comprise one or more features arranged to form strengthening or stiffening structures extending between the flange portion and the hub portion of the connector.

Chopped fibres (e.g. carbon or glass) may be introduced with the polymer to form a finished connector in which the flange portion comprises chopped-fibre reinforcement. The chopped fibres are preferably combined with the polymer (i.e. suspended within the polymer) before being introduced to the mould.

The present disclosure refers throughout to a composite connector comprising a hub portion and a flange portion. It will be appreciated that a given connector may comprise more than one flange portion per hub portion, or more than one hub portion per flange portion. Any single-ended, double-ended or multiple port connector may be included within this disclosure.

Features of any example described herein may, wherever appropriate, be applied to any other example described herein. Where reference is made to different examples or sets of examples, it should be understood that these are not necessarily distinct but may overlap.

BRIEF DESCRIPTION OF THE DRAWINGS

Certain examples of the present disclosure will now be described with reference to the accompanying drawings in which.

DETAILED DESCRIPTION

Figure 1:
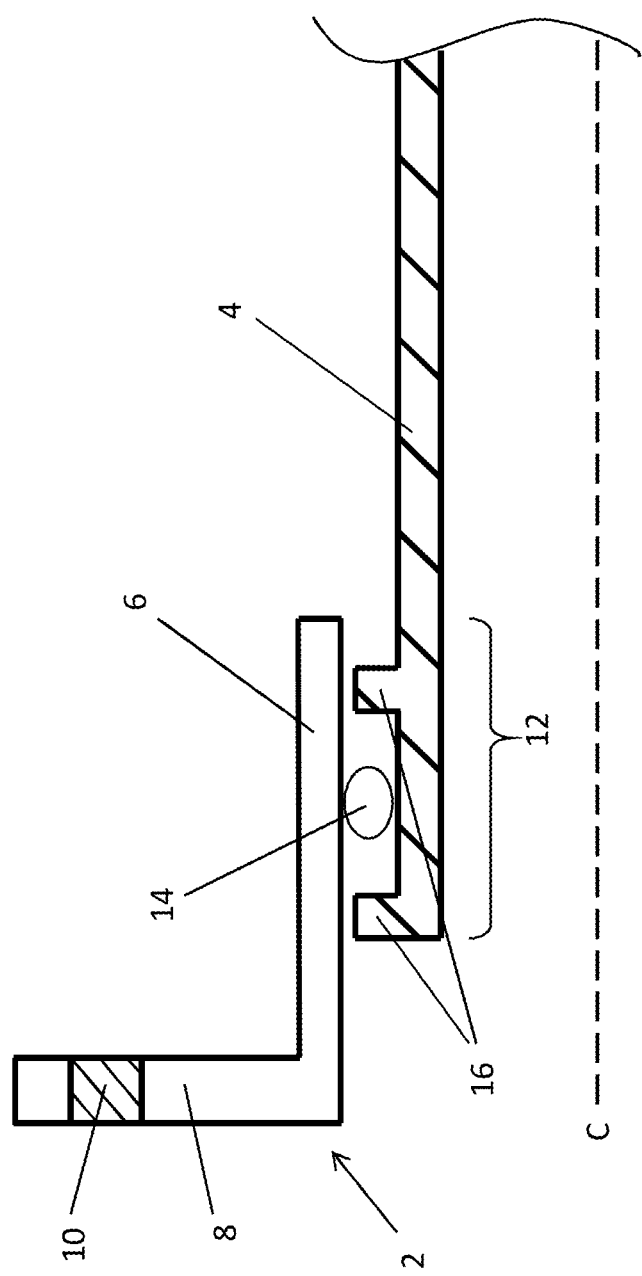
FIG. 1 shows a cross-sectional view of the connection between a connector and a fluid transfer conduit.

FIG. 1 shows the interface between a connector 2 and a cylindrical fluid transfer conduit 4 that extends parallel to a central axis C. The connector 2 comprises a cylindrical hub portion 6, which also extends parallel to the central axis C, and a flange portion 8, which extends from an end of the hub portion 6 in a direction perpendicular to the central axis C.

The flange portion 8 further comprises a through-hole 10, by which the connector 2 may be secured to another structure, e.g. an aircraft wing.

The hub portion 6 encloses a connection portion 12 of the fluid transfer conduit 4. An elastomeric O-ring 14 is located between the hub portion 6 and the connection portion 12, retained between an inner wall of the hub portion 6 and an outer wall of the fluid transfer conduit 4. The O-ring 14 is confined by two retaining ridges 16 which extend radially outwards from the connection portion 10 of the fluid transfer conduit 4.

The O-ring 14 provides a seal between the connector 2 and the conduit 4, such that fluid may flow along the conduit 4 and into the connector 2 without escaping. In addition, the configuration of O-ring 14 between the connection portion 12 and the hub portion 6 allows the fluid transfer conduit 4 to move a small distance in the direction of the central axis C relative to the connector 2 without compromising the seal. This enables a structure to which the connector 2 is secured to move or flex a small amount without imparting large stresses on the conduit 4 (as would be the case if the connector 2 was rigidly attached to the conduit 4). Instead, the conduit 4 "floats" on the O-ring 14 such that it can slide longitudinally a small distance without breaking the seal. For example, the structure to which the connector 2 is attached may be an aircraft wing spar, which is designed to move a small amount during flight as the wing flexes due to aerodynamic load and/or temperature fluctuations. The fluid transfer conduit 4 may comprise a fuel pipe located within the wing which must therefore be able to cope with the wing flex during flight.

Figure 2:
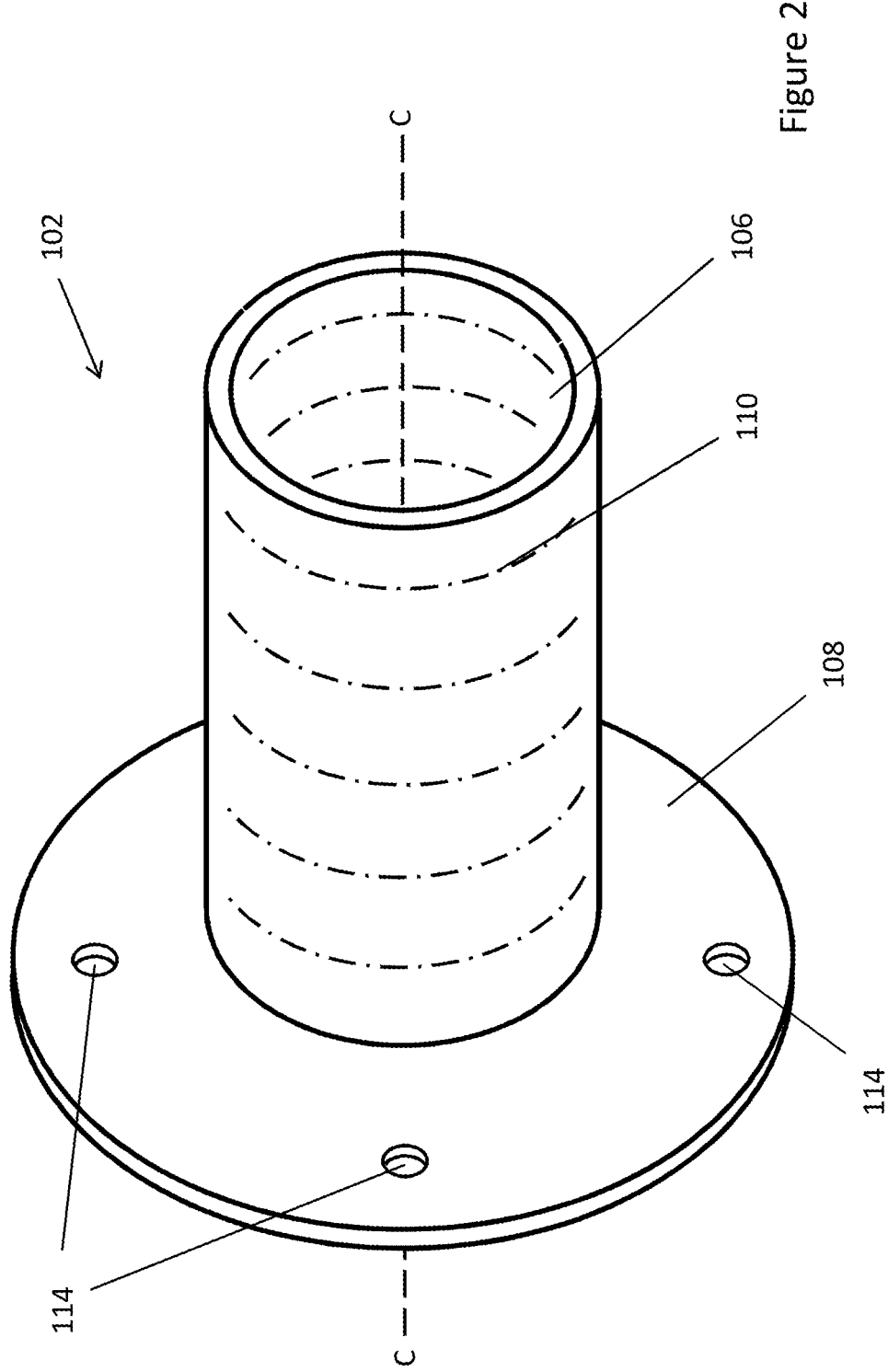
FIG. 2 shows a schematic perspective view of a composite connector for a fluid transfer conduit according to an example of the present disclosure.

FIG. 2 is a schematic perspective view of a composite connector 102 according to an example of the present disclosure. The connector 102 comprises a cylindrical hub portion 106 which extends parallel to a central axis C and a flange portion 108 which extends perpendicularly from an end of the hub portion 106. Through-holes 114 are formed in the flange portion 108.

The hub portion 106 comprises a thermoset resin matrix reinforced with hoop-wound (circumferential) fibre 110. The hoop-wound fibre 110 provides the hub portion 106 with high hoop strength such that the hub portion can resist large internal pressures. It also makes the hub portion 106 very stiff, such that large internal pressures cause negligible hoop expansion.

Figure 3:
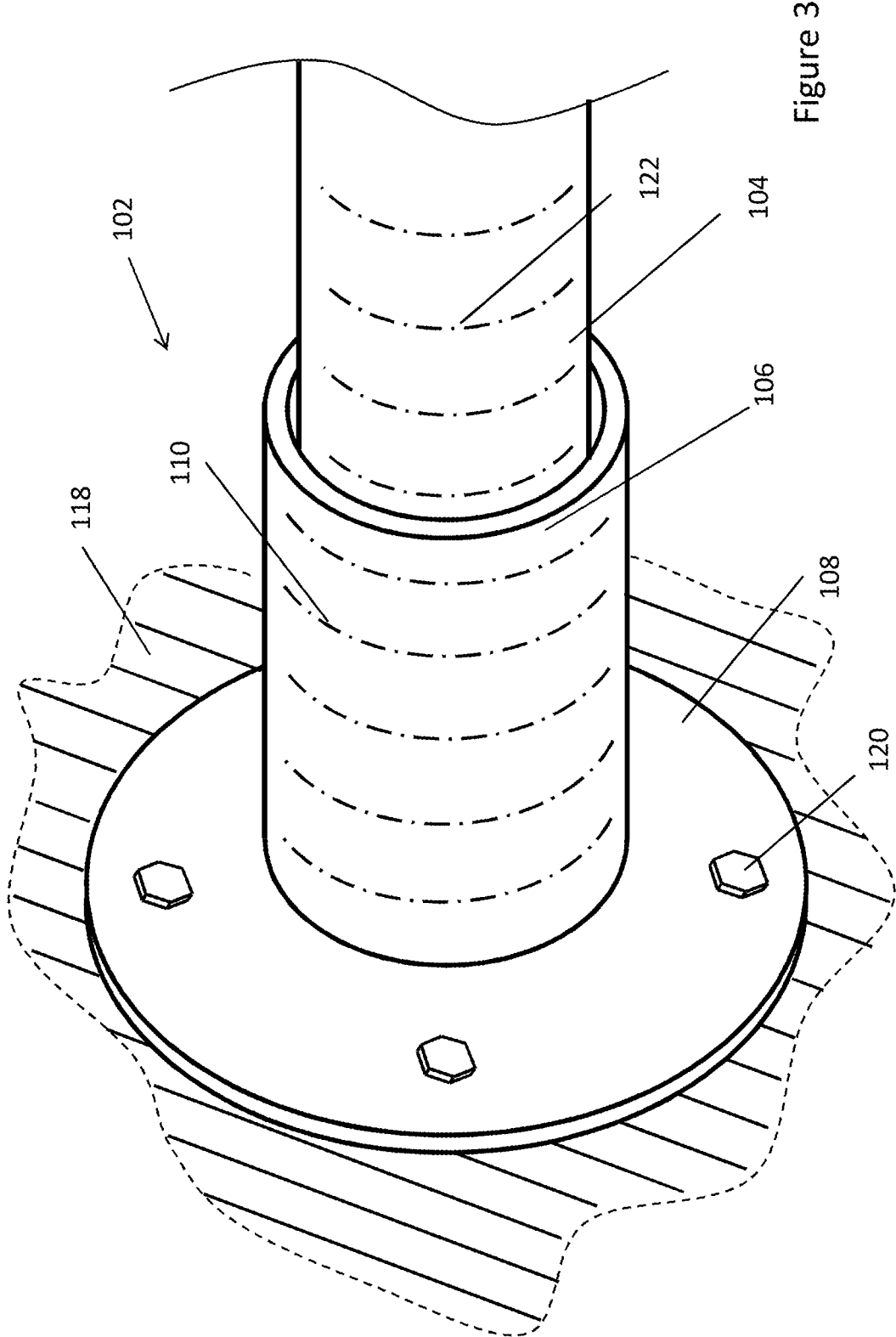
FIG. 3 shows the composite connector with a fluid transfer conduit installed therein.

FIG. 3 shows a perspective view of the composite connector 102 in use, connecting one end of a composite fuel pipe 104 to a wing spar 118 of an aircraft. The composite fuel pipe 104 extends into the hub portion 106 and floats inside on an O-ring (not shown), which also serves to seal the connection. The connector 102 is secured rigidly to the spar 118 via four bolts 120 (only three are visible in this Figure).

During flight, due to aerodynamic forces and/or temperature based expansion/contraction, the wing spar 118 (and thus the connector 102) moves relative to the second wing spar (and thus the second connector). However, because the composite fuel pipe 104 floats on an O-ring, it is able to move relative to the connectors 102 without compromising the connection.

The composite fuel pipe 104 is constructed from fibre-reinforced polymer, and comprises a high proportion of hoop wound fibre reinforcement 122. This provides the fuel pipe 104 with high hoop strength. In addition, the high proportion of hoop-wound fibre reinforcement 122 in the fuel pipe 104 means that its coefficient of thermal expansion ("hoop" CTE) is dominated by that of the fibre reinforcement 122, rather than the polymer matrix.

As mentioned above, the hub portion 106 also comprises a high proportion of hoop fibre-reinforcement 110. As such, the hoop CTE of the hub portion 106 is also dominated by that of the fibre-reinforcement 110. As a result, the hoop CTEs of the pipe 104 and the hub portion 106 are substantially equal and any thermal expansion or contraction of the pipe 104 is matched by the hub portion 106. This ensures that the connection between the connector 102 and the pipe 104 remains intact (i.e. the pressure on the O-ring remains constant) over a wide temperature range (typically −55° C. to 80° C.).

The axial CTE of the hub portion 106 and composite pipe 104 may not be matched but, as highlighted above, a small amount of axial differential movement (e.g. caused by greater axial thermal expansion of the pipe 104 than the hub portion 106) may be tolerated without any impact on the integrity of the O-ring seal.

A method of manufacturing a connector for a fluid transfer conduit according to an example of the present disclosure will now be described with reference to FIGS. 4A and 4B.

Figure 4A:
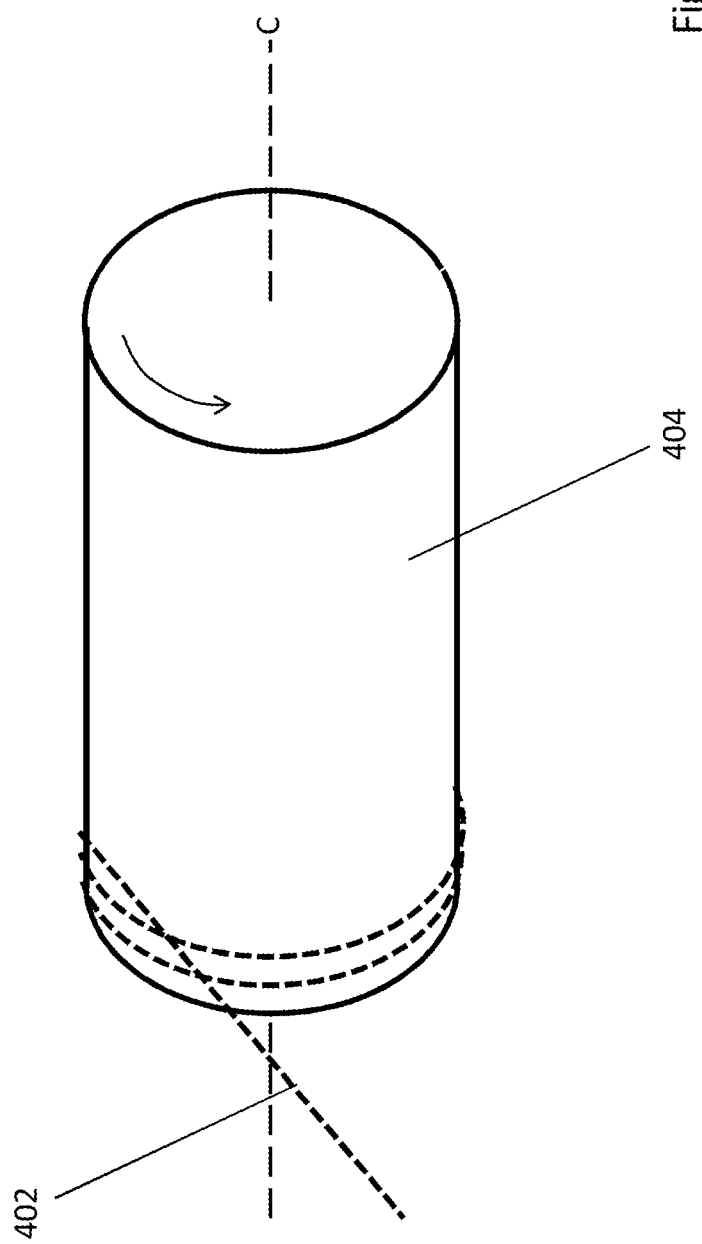
FIGS. 4A and 4B show various steps in a method of manufacturing a composite connector according to an example of the present disclosure.

FIG. 4A shows a hub portion 106 of a composite connector for a fluid transfer conduit being constructed using a conventional filament winding process. Fibre reinforcement 402 (e.g. glass fibres) is passed through a thermosetting polymer resin (e.g. epoxy) bath (not shown) and wound under tension onto a cylindrical mandrel 404. The mandrel 404 rotates about a central axis C such that the fibre 402 is laid continuously onto the mandrel 404 in a helical pattern. The position at which the fibre 402 is provided to the mandrel 404, and the speed at which the mandrel 404 rotates, may be varied to control the orientation of the fibre reinforcement 402 in the resultant hub portion 106. As can be seen in FIG. 4a, in this case the fibre 402 is wound at a high angle (i.e. circumferentially) to provide the hub portion 106 with high hoop strength.

Figure 4B:
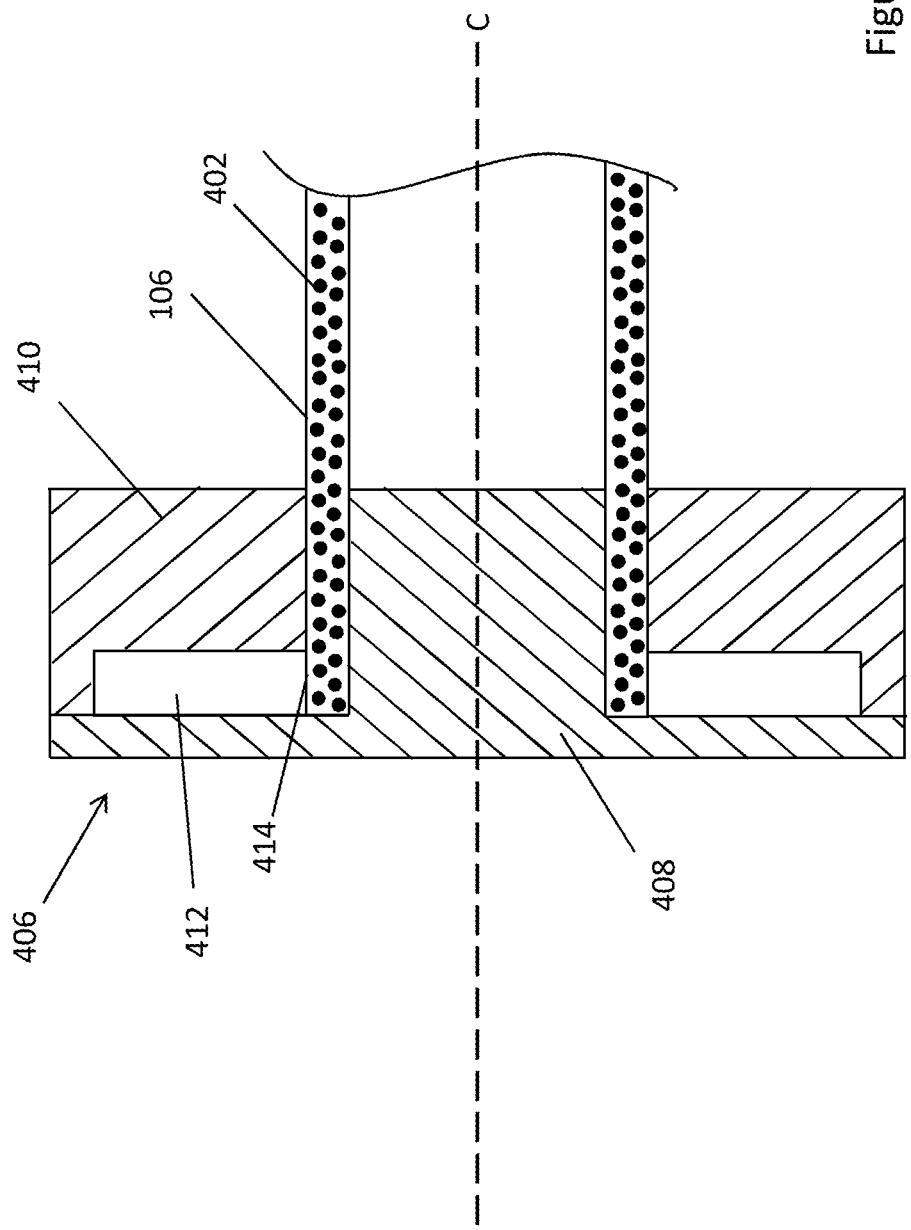

Once all the required fibre reinforcement 402 has been wound onto the mandrel 404, the hub portion 106 may be (fully or partially) cured before being placed into a mould 406, as shown in FIG. 4B.

The mould 406 into which the hub portion 106 is placed comprises a first portion 408 and a second portion 410 which, together with an outer surface 412 of the hub portion 106, define an annular cavity 412 which extends radially from the outer surface 414 of the hub portion 106.

In this example, thermosetting polymer resin is pumped into the cavity 412 through one or more input channels (not shown). Heat is applied to the mould 406 to cure the resin and form a flange portion 108 moulded around the hub portion 106. In addition, the hub portion 106 may also be cured at this stage if it has not already been cured in a previous step. The mould portions 408, 410 are then removed and the finished composite connector 102 removed.

Alternatively, the moulding step seen in FIG. 4B may be replaced by an injection moulding process, e.g. to mould a thermoplastic flange portion 108 over the hub portion 106.

Figure 5:
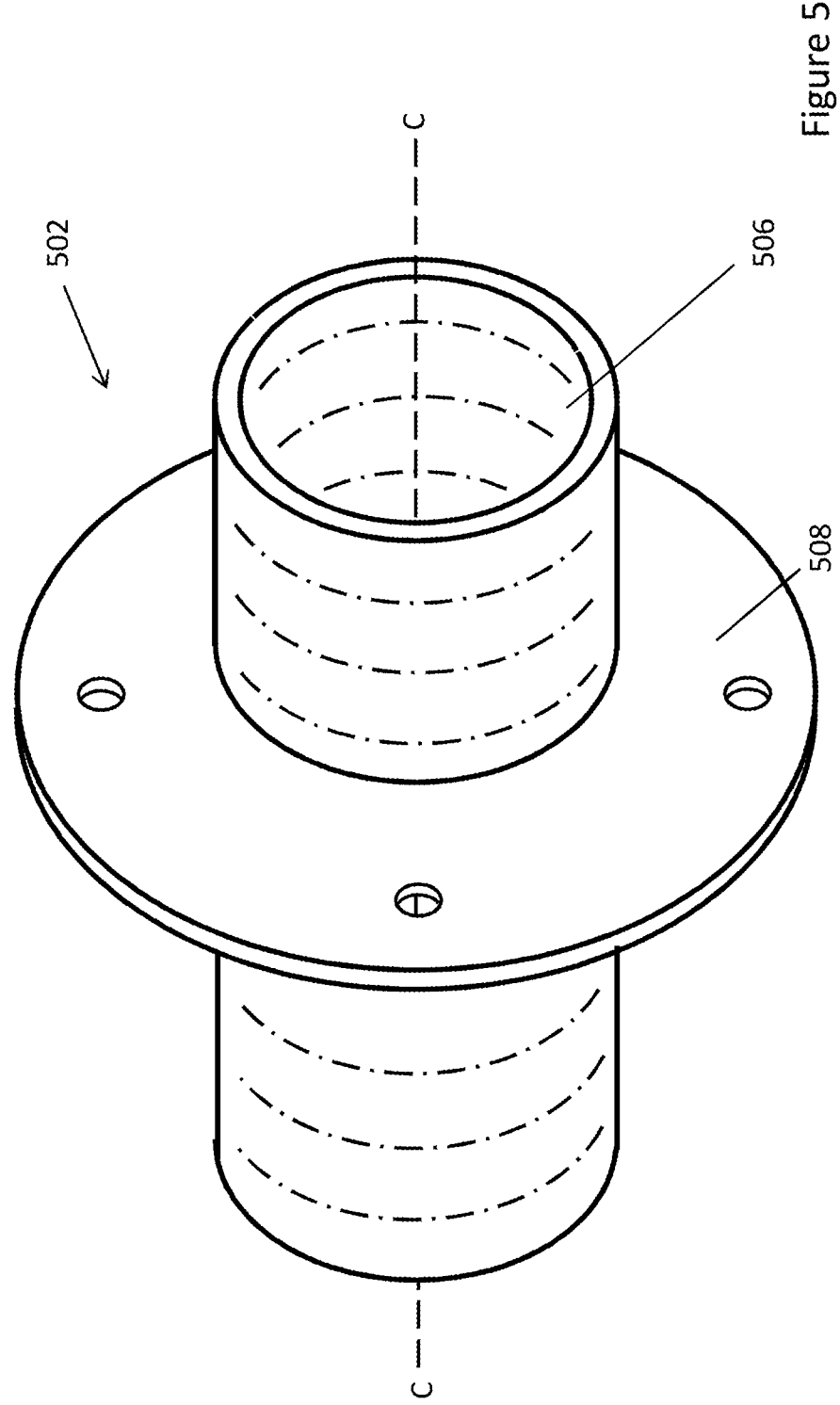
FIG. 5 shows a schematic perspective view of a composite connector according to another example of the present disclosure.

FIG. 5 shows an example of an alternative composite connector 502 with a flange portion 508 which is located partway along a hub portion 506.

The invention claimed is:

1. A composite connector formed of a fibre-reinforced polymer for a fluid transfer conduit comprising:
   a hub portion comprising a tube which extends substantially parallel to a central axis; and
   a flange portion which extends from the hub portion at an angle to the central axis;
   wherein the hub portion comprises a thermosetting polymer reinforced with continuous circumferentially-oriented fibre reinforcement;
   wherein the flange portion comprises a polymer that is moulded onto the hub portion; and
   wherein the flange portion consists of non-reinforced polymer.

2. The composite connector as claimed in claim 1, wherein the flange portion comprises a thermosetting polymer.

3. The composite connector as claimed in claim 1, wherein the hub portion comprises at least one keying feature which provides a mechanical connection between the hub portion and the flange portion.

4. The composite connector as claimed in claim 1, wherein the flange portion comprises at least one through-hole.

5. The composite connector as claimed in claim 1, wherein the flange portion is substantially perpendicular to the central axis of the hub portion.

6. The composite connector as claimed in claim 1, wherein the continuous circumferentially-oriented fibre reinforcement extends at an angle of more than 80° to the central axis.

7. A connection system comprising:
   the composite connector as claimed in claim 1; and
   a fibre-reinforced polymer fluid transfer conduit connected to the hub portion, wherein the composition and orientation of the fibre reinforcement within the hub portion is selected such that the coefficient of thermal expansion or the stiffness of the hub portion substantially matches that of the fluid transfer conduit.

* * * * *